R. W. WHITNEY.
Friction-Clutch.

No. 221,009. Patented Oct. 28, 1879.

UNITED STATES PATENT OFFICE.

RUEL W. WHITNEY, OF NEW YORK, N. Y.

IMPROVEMENT IN FRICTION-CLUTCHES.

Specification forming part of Letters Patent No. 221,009, dated October 28, 1879; application filed March 3, 1879.

*To all whom it may concern:*

Be it known that I, RUEL W. WHITNEY, of the city, county, and State of New York, have invented certain new and useful Improvements in Friction-Clutches for Sewing-Machine Wheels and Pulleys, and for other purposes, of which the following is a specification.

My invention, while adapted for use in any connection where it is desirable that rotary movement should be imparted in one direction only, has been made with special reference to its use in sewing-machines.

In Letters Patent No. 157,731, dated December 16, 1874, I have shown and described a shaft and a sewing-machine fly-wheel and pulley mounted loosely thereon, connected by means of a pawl pivoted to the shaft, and provided with an eccentric or cam faced outer end, which works in contact with a flange or rabbet on or in the rim of the wheel, and jams or wedges against the same only when the wheel is revolving in a direction to impart proper movement to the shaft.

It has been found in practice that under this arrangement there is too much friction and consequent wear of parts, the rubbing or frictional contact between the pawl and wheel taking place at or near the periphery of the wheel, where there is the most extended surface and longest distance for the pawl to travel over at each revolution, and where the speed is the greatest.

It has been my object to obviate the difficulty referred to; and my present invention consists in the combination and arrangement of instrumentalities whereby the object I have in view is accomplished.

The invention can best be explained and understood by reference to the accompanying drawings, in which—

Figure 1:
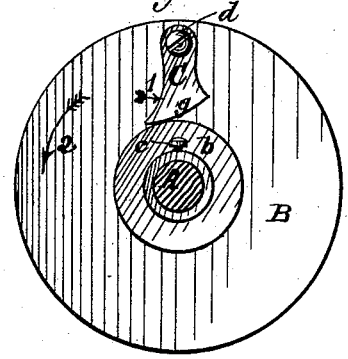
Figure 2:
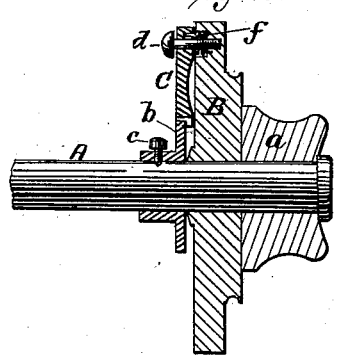
Figure 3:
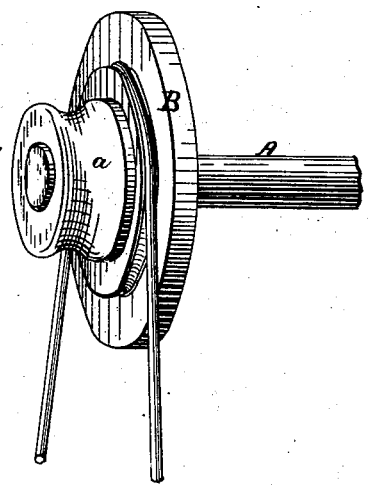

Figure 1 is a face view of a wheel or pulley mounted on a shaft, and connected therewith in accordance with my invention. Fig. 2 is a section of said parts in a plane passing through the longitudinal axis of the shaft. Fig. 3 is a perspective view of said parts.

On the shaft A is loosely mounted the fly-wheel and pulley B, held in place on said shaft, in this instance, between the knob $a$ on the one side and the hub or fixed pulley $b$, of small diameter, on the other side, fixed to the shaft by a set-screw, $c$. Pivoted by its outer end—that is to say, the end nearest the periphery of wheel B—to the wheel at $d$ is the pawl C, whose inner end overhangs and rests on the periphery of the hub $b$, and is maintained in contact therewith by a spring, $f$, attached at one end to the wheel, and at the other end to the pawl, and acting to press the pawl in the direction of arrow 1. The acting or clutch end of the pawl is eccentric or cam shaped, as shown at $g$.

The effect of the above-described arrangement is that when the wheel B revolves in the direction of the arrow 2 the pawl will jam against the periphery of the hub $b$, and thus the shaft will be compelled to follow the revolution of the wheel in this direction. When, however, the wheel revolves in the contrary direction, the pawl at once releases its bite on the hub $b$, and revolves with the wheel without rotating the shaft.

It will be seen that under the arrangement represented the rubbing contact of the two parts of the friction-clutch takes place at a point where there is but little distance to travel at each revolution, and where the speed is least; consequently, while the clutch is entirely effective, the friction and wear of parts are greatly reduced.

The knob $a$ can be used as a handle to hold the shaft or to turn it in a direction opposite to that in which the wheel moves.

Having described my invention, what I claim, and desire to secure by Letters Patent, is—

The sewing-machine shaft, and the driving wheel and pulley mounted loosely thereon, and adapted to revolve continuously in either direction, in combination with the spring-pawl pivoted to the wheel by the end nearest the periphery of said wheel, with its inner or acting end working against the periphery of the shaft or a hub fixed thereon, as herein shown and specified.

RUEL W. WHITNEY.

Witnesses:
  S. M. WHITNEY,
  EDWIN CLARK.